United States Patent
Suzuki et al.

(10) Patent No.: US 6,513,613 B2
(45) Date of Patent: Feb. 4, 2003

(54) SCOOTER-TYPE MOTORCYCLE

(75) Inventors: Shosuke Suzuki, Saitama (JP); Fumie Okada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/875,906

(22) Filed: Jun. 8, 2001

(65) Prior Publication Data

US 2002/0005308 A1 Jan. 17, 2002

(30) Foreign Application Priority Data

Jun. 9, 2000 (JP) ........................................ 2000-179355

(51) Int. Cl.$^7$ .............................................. B62K 11/04
(52) U.S. Cl. ........................................ 180/227; 180/230
(58) Field of Search ................................. 180/219, 226, 180/227, 228, 230, 231; 280/284

(56) References Cited

U.S. PATENT DOCUMENTS

| | | | | |
|---|---|---|---|---|
| 3,884,316 A | * | 5/1975 | Bowers | 180/230 |
| 4,498,553 A | * | 2/1985 | Kurata et al. | 180/230 |
| 4,697,664 A | * | 10/1987 | Kohyama | 180/230 |
| 5,531,289 A | * | 7/1996 | Muramatsu | 180/227 |
| 6,073,719 A | * | 6/2000 | Ohmika et al. | 180/219 |
| 6,349,785 B1 | * | 2/2002 | Ohmika et al. | 180/227 |

FOREIGN PATENT DOCUMENTS

JP A3213482 9/1991

* cited by examiner

*Primary Examiner*—Anne Marie Boehler
(74) *Attorney, Agent, or Firm*—Birch, Stewart, Kolasch & Birch, LLP

(57) ABSTRACT

A motorcycle, such as a scooter-type motorcycle, includes an engine main body. The engine main body is non-swingably supported by a frame at a location under a seat. A transmission case is swingably supported by the engine main body. A rear wheel is attached to the transmission case and hence swingable relative to the frame. A fuel system is provided atop the engine main body, and hence is not swingably relative to the frame. The engine main body has cylinder bores which are spaced across the width of the motorcycle. The cylinder bores are tilted upwardly and forwardly, so as to create a space below a forward portion of the engine main body. A fuel tank has a rear portion disposed below the forward portion of the engine main body.

17 Claims, 4 Drawing Sheets

SCOOTER-TYPE MOTORCYCLE

BACKGROUND OF THE INVENTION

1. Field of the Invention

The present invention relates to a motorcycle, such as a scooter-type motorcycle, wherein an engine is mounted on a body frame and a rear wheel is supported by a transmission case, provided between the engine and the rear wheel.

2. Description of the Relevant Art

Japanese Patent Laid-open No. Hei 3-213482 describes a scooter-type motorcycle. The motorcycle includes an engine main body, which is swingably supported by a body frame. An intake system is disposed between the engine main body and a seat.

The intake system swings together with the engine main body. As a result, a space must be provided between the engine and the seat for allowing the swing motion of the intake system. Therefore, the seat must be mounted at a relatively high position. Further, since the parts, associated with the intake system (such as cables, vacuum and gas hoses) are swung, the parts are subjected to increased wear and the service lives of these parts are degraded.

SUMMARY OF THE INVENTION

It is an object of the present invention to provide a motorcycle which addresses one or more of the drawbacks associated with the background art.

It is an object of the present invention to provide a motorcycle capable of mounting a seat at a relatively lower position.

It is an object of the present invention to provide a motorcycle that enhances the durability of parts associated with an intake system.

These and other objects are achieved by a scooter-type motorcycle having an engine including an engine main body disposed with the axial line of a cylinder bore directed forwardly. The engine main body is mounted on a body frame and a rear wheel is rotatably supported by a transmission case of a transmission provided between the engine and the rear wheel. The engine main body is non-swingably supported, at a position under a seat of the motorcycle, by the body frame. The transmission case is swingably supported by the engine main body. An intake port is provided in the engine main body in such a manner as to be opened upwardly. A throttle body is disposed with its axial line extending substantially in the horizontal direction and is connected, at a position under the seat, to the intake port via an intake pipe.

With a configuration in accordance with the present invention, since the engine main body of the engine is non-swingably supported by the body frame, the intake system including the intake pipe with its downstream end connected to the intake port of the engine main body and the throttle valve connected to the upstream end of the intake pipe is not swingable. As a result, it is possible to eliminate a space, for allowing the swing motion of the intake system, between the engine main body and the seat, and hence to mount the seat at a lower position. Further, since the parts associated with the intake system are not swingable, it is possible to improve the durability of these parts.

Also according to the present invention, a fuel injection valve, covered from above with the seat, is mounted to the intake pipe. With this configuration, it is possible to absorb any tapping noise caused by the fuel injection valve by the seat, and hence to suppress the tapping noise. Further, since parts associated with the fuel injection valve, such as fuel hoses continuous to the fuel injection valve are not swingable, it is possible to improve the durability of the parts associated with the fuel injection valve.

Also according to the present invention, the engine main body is supported by the body frame in such a manner that the axial line of the cylinder bore is tilted forwardly and upwardly. As a result, it is possible to ensure a space, for disposing auxiliary parts of the motorcycle (such as a gas or oil tank) in front of the engine main body while avoiding enlargement of the scooter-type motorcycle.

Also according to the present invention, a pair of cylinder bores arranged in the width direction of the body frame are provided in the engine main body. With this configuration, it is possible to increase the displacement of the engine while avoiding an increase in height of the main seat.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
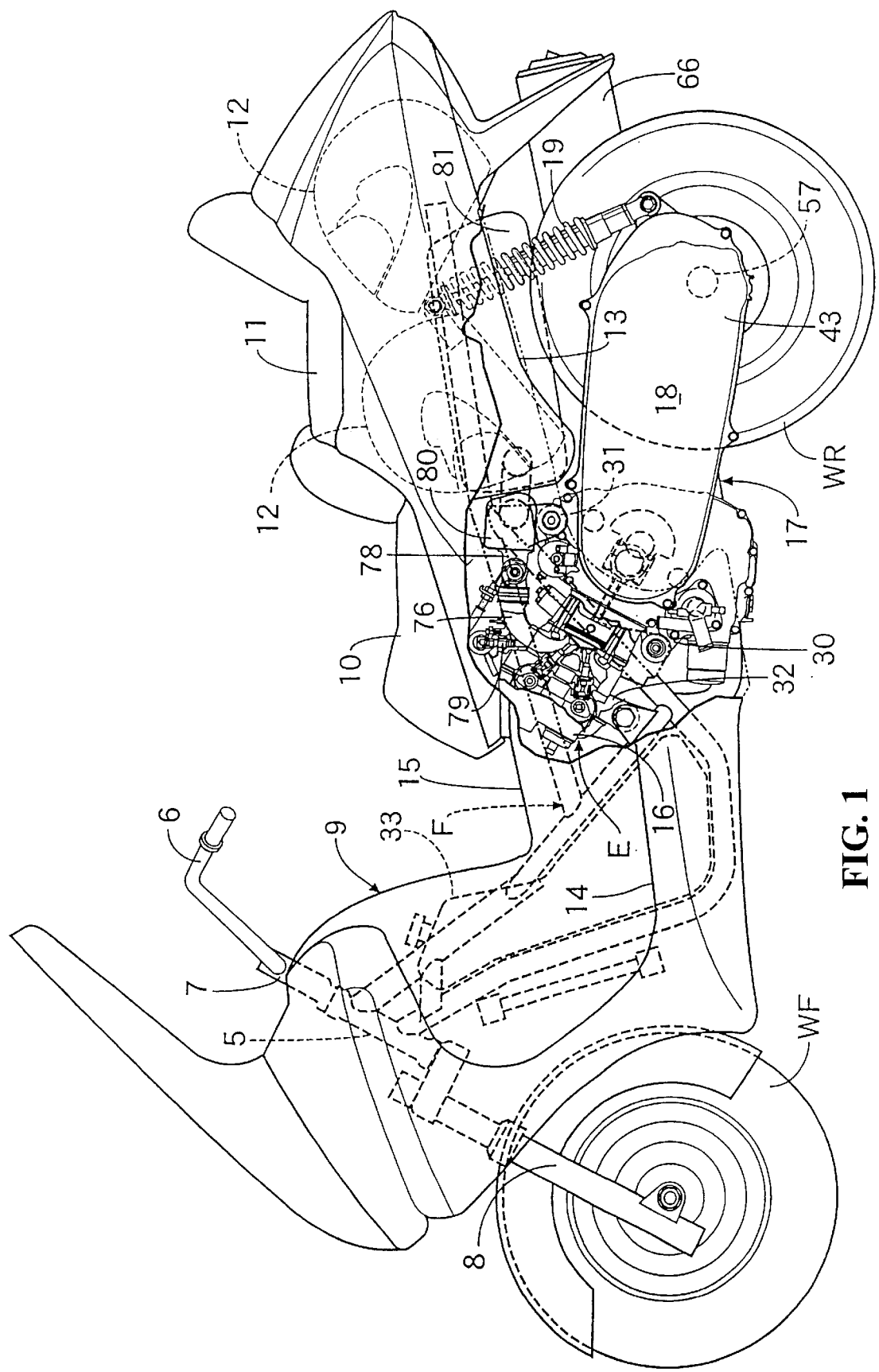
FIG. 1 is a side view of a scooter-type motorcycle, with parts partially cutaway.
Figure 2:
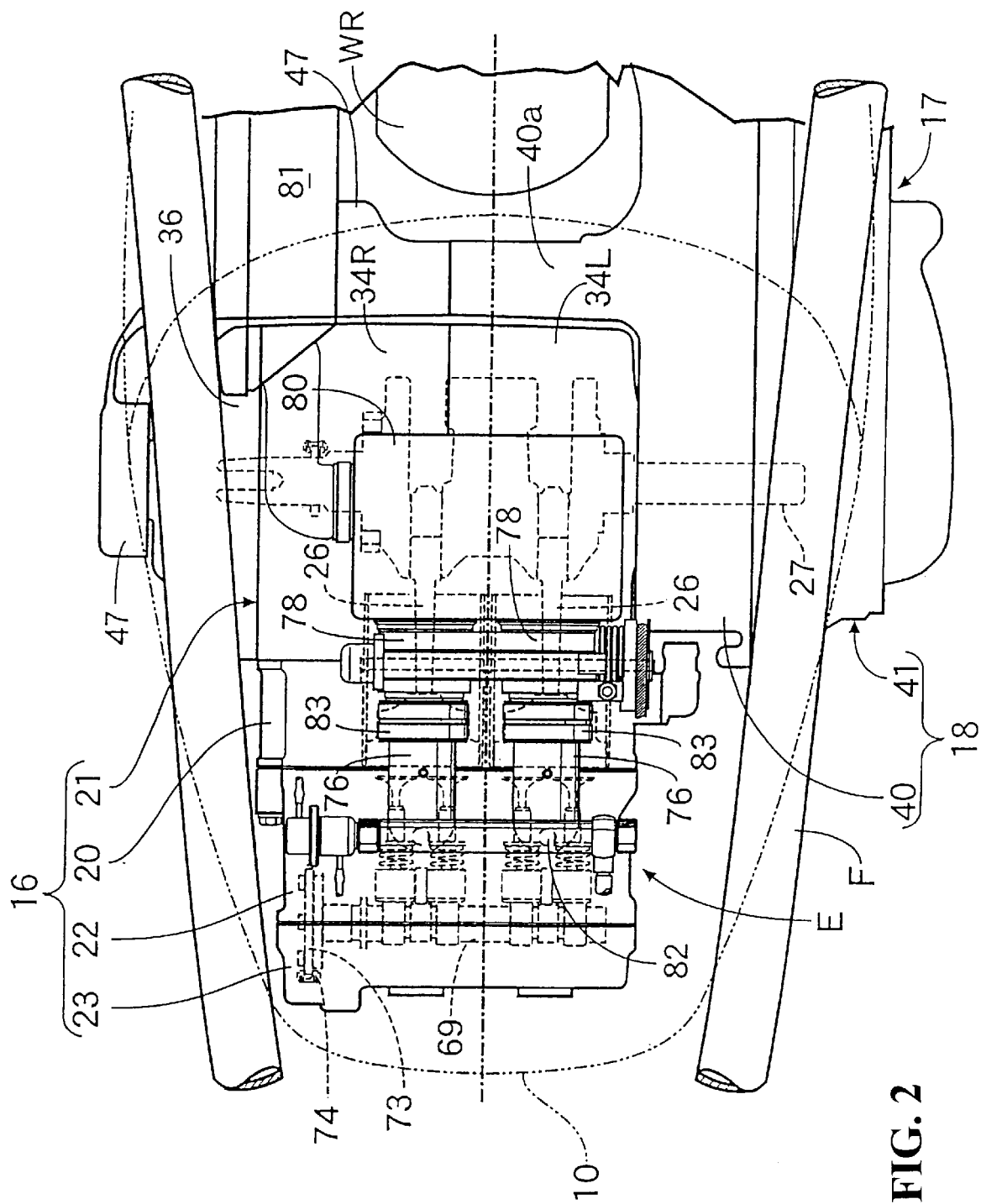
FIG. 2 is a plan view of an engine of the motorcycle with a seat removed.
Figure 3:
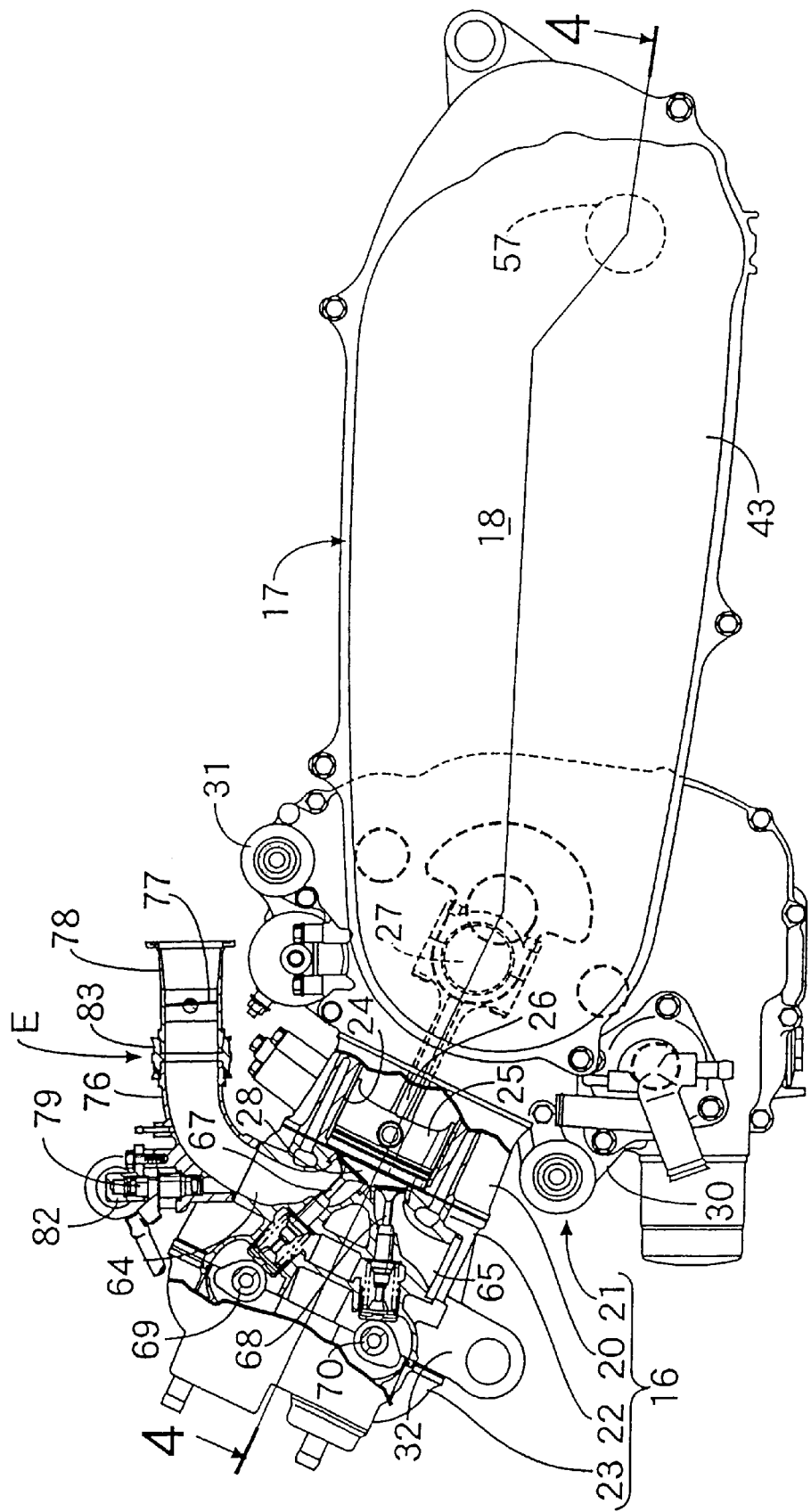
FIG. 3 is a side view of an engine main body and a transmission of the motorcycle, with parts partially cutaway.
Figure 4:
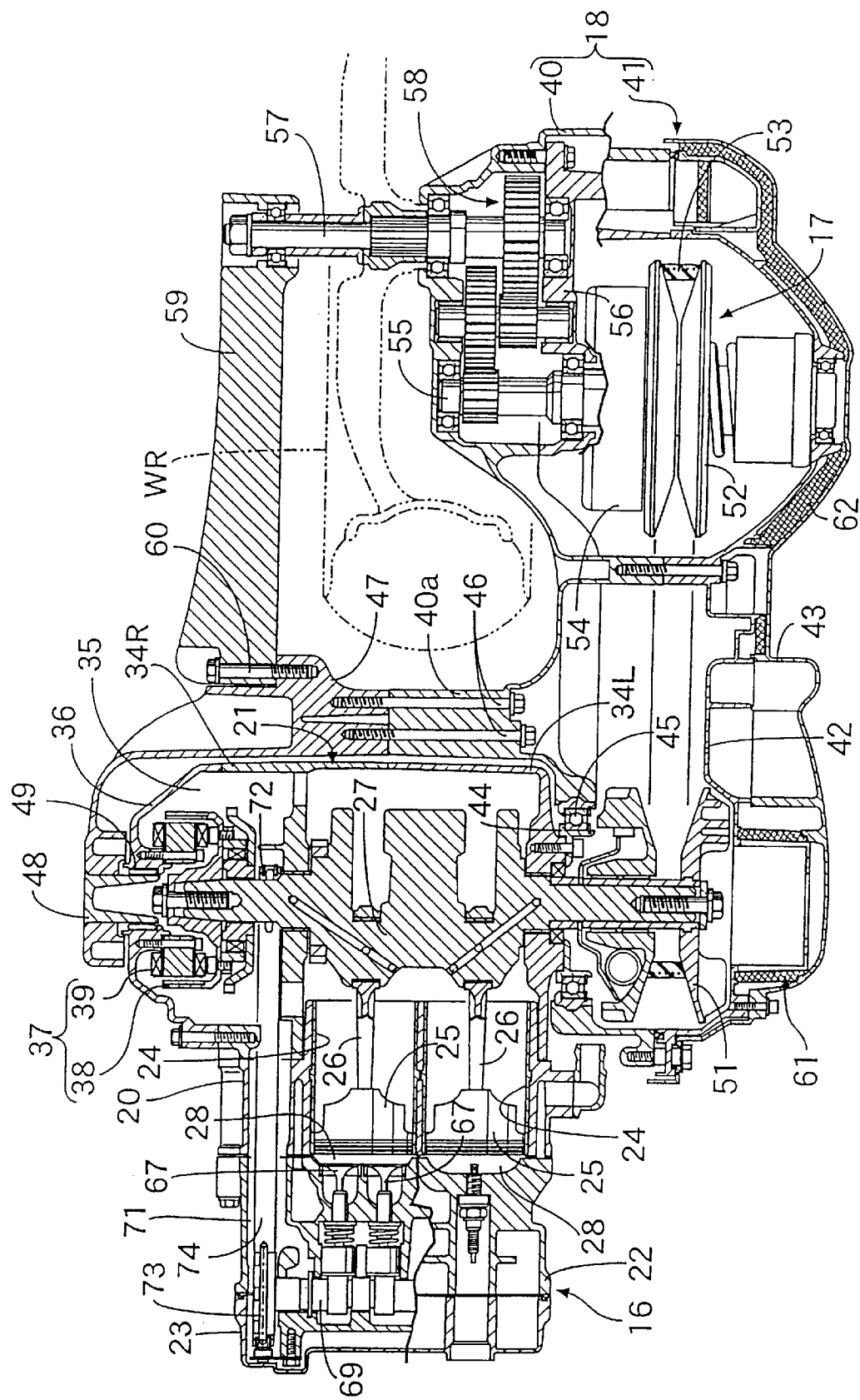
FIG. 4 is a cross-sectional view taken along line 4—4 of FIG. 3.

FIG. 1 illustrates a scooter-type motorcycle including a body frame F, having at its front end a head pipe 5. A steering shaft 7 is steerably supported by the head pipe 5. A steering handlebar 6 is provided on the upper end of the steering shaft 7, and a front fork 8 is continuous to the lower end of the steering shaft 7. A front wheel WF is rotatably supported by lower end portions of the front fork 8.

The body frame F is covered with a cover 9. A main seat 10 for a driver and a pillion seat 11 for a passenger are provided on a rear portion of the cover 9. The pillion seat 11 can be opened and closed relative to the cover 9 to access a luggage box 13. The luggage box 13 is mounted to a rear portion of the body frame F and includes an opening portion at its upper end that is closable via the pillion seat 11. The luggage box 13 may contain helmets 12, and the like.

The cover 9 is provided with a pair of right and left step floors 14. The right and left step floors 14 allow a driver sitting on the main seat 10 to rest his or her feet thereon. A floor tunnel cover 15 is raised upwardly between the right and left step floors 14.

An engine main body 16 of a two-cylinder engine E is non-swingably supported by the body frame F. The engine main body 16 is located at a position under the main seat 10. A transmission 17 having a transmission case 18 is provided between the engine E and a rear wheel WR. The rear wheel WR is rotatably supported by a rear portion of the transmission case 18. A front portion of the transmission case 18 is swingably supported by the engine main body 16. A rear cushion or shock absorber 19 is provided between a rear portion of the transmission case 18 and the body frame F.

Referring to FIGS. 1 to 4, the engine main body 16 includes a cylinder block 20 having a pair of parallel cylinder bores 24. A crankcase 21 is connected to the cylinder block 20. The crankcase 21 rotatably supports a crankshaft 27 connected via two connecting rods 26 to two pistons 25 slidably fitted in the two cylinder bores 24.

The engine main body 16 also includes a cylinder head 22 connected to the cylinder block 20. The cylinder head 22 includes two combustion chambers 28 facing to the two pistons 25. A head cover 23 is connected to the cylinder head 22, on the side opposed to the cylinder block 20.

A first supporting arm portion 30 and a second supporting arm portion 31 are provided on a lower front portion and an upper rear portion of the crankcase 21, respectively. A third supporting arm portion 32 is provided on a lower portion of the cylinder head 22. The first, second, and third supporting arm portions 30, 31, and 32 are connected to the body frame F, whereby the engine main body 16 is non-swingably supported by the body frame F. To be more specific, the engine main body 16 is supported by the body frame F in such a posture that the axial lines of the pair of cylinder bores 24, arranged in the width direction of the body frame F, are tilted forwardly and upwardly.

When the axial lines of the cylinder bores 24 are tilted forwardly and upwardly, a space is formed in front of the engine main body 16. The space can advantageous accommodate at least a portion of a fuel tank 33. As illustrated in FIG. 1, the fuel tank 33 is mounted on a front portion of the body frame F with a rear portion thereof disposed in the space below the engine main body 16.

The crankcase 21 is formed by connecting a right crankcase half 34R and a left crankcase half 34L. A case cover 36 is connected to the right crankcase half 34R, a space between the case cover 36 and the right crankcase half 34R is a generator chamber 35.

In the generator chamber 35, an outer rotor 38 and an inner stator 39 form an AC generator 37. The outer rotor 38 is fixed to the crankshaft 27. The inner stator 39 is fixed to the case cover 36.

The transmission case 18 is formed by connecting a right case 40 to a left case 41. The transmission case 18 is disposed on the left side of the crankcase 21 of the engine main body 16 and the rear wheel WR.

The left case 41 includes a case inner wall 42. The case inner wall 42 is fastened to the right case 40. A case outer wall 43 is fastened to the case inner wall 42 with a gap formed between the outer surface of the case inner wall 42 and the case outer wall 43.

A ring-shaped supporting member 44 is fastened to the outer surface of the left case half 34L of the crankcase 21. The ring-shaped supporting member 44 surrounds the crankshaft 27, which rotatably passes through the left case half 34L and projects into the transmission case 18.

A front portion of the right case 40 is turnably supported by the supporting member 44, via ball bearings 45. A connecting portion 40a extending to the rear side of the crankcase 21 is integrally provided on the right case 40. A supporting case 47 is fastened to the connecting portion 40a by means of two bolts 46. The supporting case 47 is formed in such a manner as to extend from the right side of the case cover 36 to the rear side of the crankcase 21. A shaft 48 is connected to a front portion of the supporting case 47 in such a manner as to be coaxial with the crankshaft 27, and is turnably supported by the case cover 36 via roller bearings 49. With this configuration, the transmission case 18 is supported by the engine main body 16 in such a manner as to be swingable around an axial line, which is coaxial with the crankshaft 27.

The transmission 17 contained in the transmission case 18 is of a known belt type, in which an endless belt 53 is wound around a drive pulley 51 provided on the crankshaft 27 and a driven pulley 52 connected to an output shaft 55 via a centrifugal clutch 54. In this transmission 17, the effective radius of the driven pulley 52 becomes smaller as the effective radius of the drive pulley 51 becomes larger with an increase in rotational speed of the crankshaft 27, to thereby continuously vary the speed change ratio from a LOW ratio to a TOP ratio.

In the transmission case 18, a supporting wall 56 is fastened to the right case 40. The output shaft 55 is rotatably supported by both the right case 40 and the supporting wall 56. One end portion of an axle 57, to which the rear wheel WR is fixed, is also rotatably supported by both the right case 40 and the supporting wall 56. A reduction gear train 58, provided between the output shaft 55 and the axle 57, is contained between the right case 40 and the supporting wall 56. The end portion of the axle 57 is rotatably supported by a rear portion of a swing arm 59 disposed on the right side of the rear wheel WR. A front end portion of the swing arm 59 is fastened to the supporting case 47 by means of a bolt 60.

A cooling air cleaner 61 is provided in a front portion of the transmission case 18 at a position between the case inner wall 42 and the case outer wall 43. Air for cooling the belt-type transmission 17 is introduced from outside of the transmission case 18 into the transmission case 18, via the cooling air cleaner 61.

A sound absorption material 62 is provided in a rear portion of the transmission case 18 in such a manner as to be held between the case inner wall 42 and the case outer wall 43. With this configuration, the left case 41 on the rear side of the transmission case 18 has a sound absorption structure.

Two pairs of intake ports 64 (one pair for each combustion chamber 28) are provided in the cylinder head 22 of the engine main body 16 in such a manner as to be opened obliquely upwardly. Similarly, two pairs of exhaust ports 65 (one pair for each combustion chamber 28) are provided in the cylinder head 22 of the engine main body 16 in such a manner as to be opened obliquely downwardly. An exhaust system including an exhaust muffler 66 (see FIG. 1) disposed on the right side of the rear wheel WR is connected to the exhaust ports 65.

Two pairs of intake valves 67 (one pair for each combustion chamber 28), each of which is adapted to open/close the communication between the intake port 64 and the combustion chamber 28, are disposed in the cylinder head 22. Similarly, two pairs of exhaust valves 68 (one pair for each combustion chamber 28), each of which is adapted to open/close the communication between the exhaust port 65 and the combustion chamber 28, are disposed in the cylinder head 22. An intake side camshaft 69 for opening/closing the intake valves 67, and an exhaust side camshaft 70 for opening/closing the exhaust valves 68 are supported by the cylinder head 22 with the axial lines thereof extending in the direction parallel to the crankshaft 27.

First ends of the camshafts 69 and 70 are disposed in a chain chamber 71. The chain chamber 71 is provided in the crankcase 21, cylinder block 20, cylinder head 22, and head cover 23 in such a manner as to be communicated to the generator chamber 35. A drive sprocket 72 is integrally provided on the crankshaft 27 at a position located in the chain chamber 71. An endless type timing chain 74 resides in the chain chamber 71 and is wound around the drive sprocket 72, a driven sprocket 73 fixed to one end of the intake side camshaft 70, and a driven sprocket (not shown) fixed to one end of the exhaust side camshaft 71.

Two throttle bodies 78, each having a throttle valve 77, are disposed under the main seat 10 with their axial lines extending substantially in the horizontal direction. Upstream ends of two intake pipes 76 are connected to downstream ends of the two throttle bodies 78 via two connecting hoses 83. Downstream ends of each intake pipe 76 are connected to the pair of intake ports 64 formed in the cylinder head 22.

Each intake pipe 76 includes a rear portion extending forwardly, substantially in the horizontal direction, from the throttle body 78 having the axial line extending substantially in the horizontal direction. Each intake pipe 76 also includes a curved portion continuous to the rear portion, and a front portion extending obliquely rearwardly from the curved portion into a respective one of the intake ports 64. Two fuel injection valves 79, which are covered from above with the main seat 10, are mounted to the curved portions of each intake pipes 76 in such a posture as to allow direct injection of fuel toward the two intake valves 67. The rear ends of the fuel injection vales 79 are commonly connected to a fuel rail 82.

The upstream ends of the throttle bodies 78 are commonly connected to an intake chamber 80 disposed in front of the luggage box 13. The intake chamber 80 is connected, on the right side of the luggage box 13 (e.g., on the right side of the rear wheel WR) to an air cleaner 81 disposed over the exhaust muffler 66. With this configuration, since the exhaust muffler 66 and the air cleaner 81 are non-swingably disposed on the right side of the rear wheel WR, it is possible to ensure a wide space allowing the swing motion of the transmission case 18 of the transmission 17 on the left side of the rear wheel WR, while maintaining sufficient capacities for the exhaust muffler 66 and the air cleaner 81.

The function of this embodiment will be described below. Since the engine main body 16 of the engine E is non-swingably supported by the body frame F, the intake system of the engine E is not swingable. The intake system of the engine E includes the throttle bodies 78 disposed under the main seat 10 with their axial lines extending substantially in the horizontal direction; the intake pipes 76 for connecting the intake ports 64 of the engine main body 16 to the throttle bodies 78; the fuel injection valves 79 mounted to the intake pipes 76; the intake body 80; and the air cleaner 81.

By the present invention, it is possible to eliminate the need of ensuring a space, for allowing the swing motion of the intake system, between the engine main body 16 and the main seat 10, and hence to decrease the height of the main seat 10. Since parts of the intake system, such as cables associated with the throttle valves 77 of the throttle bodies 78 and hoses associated with the fuel injection valves 79, are not swingable, it is possible to improve the durability of the parts.

Since the fuel injection valves 79 are mounted in the intake pipes 76 in such a manner as to be covered from above with the main seat 10, it is possible to absorb any tapping noise caused by operation of the fuel injection valves 79, and hence to suppress the tapping noise.

Since the engine main body 16 is supported by the body frame F in such a manner that the axial lines of the pair of cylinder bores 24 of the engine main body 16 are tilted forwardly and upwardly, it is possible to provide a space, for disposing auxiliaries, such as the fuel tank 33, in front of the engine main body 16 while avoiding enlargement of the scooter-type motorcycle.

Since both the cylinder bores 24 are provided in the engine main body 16 in such a manner as to be arranged in the width direction of the body frame F, it is possible to increase the displacement of the engine E while avoiding an increase in height of the main seat 10.

The transmission case 18 is swingably supported by the crankcase 21 of the engine main body 16; however, the swinging axial line of the transmission case 18 is coaxial with the axial line of the drive pulley 51 of the belt-type transmission 17 (e.g. the axial line of the crankshaft 27). Accordingly, a load due to the swing motion of the transmission case 18 is not forcibly applied to the endless belt 53 of the transmission 17.

While the embodiment of the present invention has been described using specific terms, the present invention is not limited thereto, and it is to be understood that various changes in design may be made without departing from the spirit or scope of the claims.

For example, in the above-described embodiment, the present invention is applied to the scooter-type motorcycle having a tandem seat including the main seat 10 and the pillion seat 11. However, the present invention can be applied to a scooter-type motorcycle having only a driver's seat. In this case, even if the motorcycle is configured such that a luggage box is disposed under the seat, the height of the seat can be decreased.

In accordance with the present invention, since the engine main body of the engine is non-swingably supported by the body frame, the intake system including the intake pipe and the throttle valve is not swingable. It is therefore possible to eliminate the need of ensuring a space, for allowing the swing motion of the intake system, between the engine main body and the seat. Hence, the seat can be mounted at a lower position. Further, the durability of the parts associated with the intake system, such as cables, are improved.

In accordance with the present invention, it is possible to suppress the tapping noise caused by the fuel injection valve, and to improve the durability of the parts associated with the fuel injection valve.

In accordance with the present invention, it is possible to ensure a space, for disposing auxiliaries in front of the engine main body while avoiding enlargement of the scooter-type motorcycle.

In accordance with the present invention, it is possible to increase the displacement of the engine while avoiding an increase in a height of the main seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motorcycle comprising:

a body frame;

an engine including an engine main body, wherein said engine main body is non-swingably connected to said body frame and wherein said engine main body includes an intake port which opens upwardly;

a transmission including a transmission case swingably connected to said engine main body;

a rear wheel rotatably supported by said transmission case;

a seat provided on said body frame, wherein said engine main body is located under said seat;

a throttle body having an axial line of extension which extends substantially in a horizontal direction, wherein said throttle body is located under said seat; and an intake pipe connecting said throttle body to said intake port.

2. The motorcycle according to claim 1, further comprising:

a fuel injection valve located below said seat, wherein said fuel injection valve is connected to said intake pipe.

3. The motorcycle according to claim 1, wherein said engine main body includes a cylinder bore having an axial line of extension which extends in a substantially forward direction relative to a normal travel direction of the motorcycle.

4. The motorcycle according to claim 3, wherein said axial line of extension of said cylinder bore is tilted forwardly and upwardly relative to a normal travel direction of the motorcycle.

5. The motorcycle according to claim 1, further comprising:

a fuel tank for storing fuel for said engine, wherein a portion of said fuel tank is disposed under said engine main body.

6. The motorcycle according to claim 1, further comprising:

a swing arm swingably connected to said body frame, extending along one side of said rear wheel, and rotatably supporting an axle of said rear wheel, and wherein said transmission case extends along an opposite side of said rear wheel.

7. The motorcycle according to claim 6, further comprising:

a muffler for exhausting gases from said engine, wherein said muffler extends along said one side of said rear wheel.

8. The motorcycle according to claim 7, further comprising:

an air cleaner for supplying air to said engine, wherein said air cleaner extends along said one side of said rear wheel.

9. The motorcycle according to claim 8, wherein said muffler and said air cleaner are non-swingably disposed relative to said body frame.

10. The motorcycle according to claim 1, wherein said transmission case is supported for swingable movement relative to said engine main body via a plurality of ball or roller bearings.

11. The motorcycle according to claim 1, wherein said engine main body includes first and second cylinder bores arranged across a width of the motorcycle relative to a normal travel direction.

12. The motorcycle according to claim 11, wherein said first and second cylinder bores include first and second parallel axial lines of extension, which extend in a substantially forward direction relative to a normal travel direction of the motorcycle.

13. The motorcycle according to claim 12, wherein said first and second axial lines of extension are tilted forwardly and upwardly relative to a normal travel direction of the motorcycle.

14. The motorcycle according to claim 1, wherein said seat is a main seat, and further comprising:

a pillion seat disposed rearward of said main seat in a normal travel direction of said motorcycle; and a luggage box disposed below said pillion seat and above said rear wheel, wherein said pillion seat is moveable relative to said frame body to access said luggage box.

15. The motorcycle according to claim 1, wherein said transmission case is pivotably mounted to said engine main body about a pivot axis.

16. The motorcycle according to claim 15, wherein said pivot axis is coaxial with an axis of rotation of a crank of said engine main body.

17. The motorcycle according to claim 15, wherein said pivot axis is coaxial with a drive pulley or gear for supplying a driving force to said transmission.

* * * * *